(12) United States Patent
Lin et al.

(10) Patent No.: US 9,800,163 B2
(45) Date of Patent: Oct. 24, 2017

(54) METHOD FOR CONTROLLING A DEAD TIME OF A SECONDARY SIDE OF A POWER CONVERTER

(71) Applicant: Leadtrend Technology Corp., Hsinchu County (TW)

(72) Inventors: Chung-Wei Lin, Hsinchu County (TW); Yang-Sheng Lin, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 15/352,531

(22) Filed: Nov. 15, 2016

(65) Prior Publication Data
US 2017/0141687 A1 May 18, 2017

(30) Foreign Application Priority Data
Nov. 16, 2015 (TW) .............................. 104137768 A

(51) Int. Cl.
*H02M 3/335* (2006.01)

(52) U.S. Cl.
CPC ............................... *H02M 3/33507* (2013.01)

(58) Field of Classification Search
CPC ....................... H02M 3/33507; H02M 3/33592
See application file for complete search history.

(56) References Cited

U.S. PATENT DOCUMENTS

| | | | | |
|---|---|---|---|---|
| 6,418,039 B2* | 7/2002 | Lentini | ............. | H02M 3/33592 363/21.05 |
| 8,023,289 B2* | 9/2011 | Yang | ................. | H02M 3/33592 363/21.02 |
| 8,576,587 B2* | 11/2013 | Hsu | ................... | H02M 3/33592 363/21.06 |
| 2008/0055942 A1* | 3/2008 | Tao | ................... | H02M 3/33592 363/21.03 |
| 2009/0175056 A1* | 7/2009 | Choi | ................. | H02M 3/33569 363/21.06 |
| 2011/0150521 A1* | 6/2011 | Uchiyama | ......... | H02M 3/33592 363/21.14 |
| 2011/0211370 A1* | 9/2011 | Luo | ................... | H02M 3/33592 363/21.02 |

* cited by examiner

*Primary Examiner* — Jue Zhang
(74) *Attorney, Agent, or Firm* — Winston Hsu

(57) ABSTRACT

A method for controlling a dead time of a secondary side of a power converter includes giving a previous first turning-on time and a current first turning-on time corresponding to a primary side of the power converter, generating a first voltage and a second voltage according to the previous first turning-on time and the current first turning-on time, respectively, generating a current first target voltage according to the first voltage, the second voltage, and an ideal voltage corresponding to a previous ideal second turning-on time of the secondary side, and determining a current second turning-on time of the secondary side according to the current first target voltage and a first ramp voltage corresponding to a current ideal second turning-on time of the secondary side. A difference between the current second turning-on time and the current ideal second turning-on time is a current dead time.

24 Claims, 9 Drawing Sheets

METHOD FOR CONTROLLING A DEAD TIME OF A SECONDARY SIDE OF A POWER CONVERTER

BACKGROUND OF THE INVENTION

1. Field of the Invention

The present invention relates to a method for controlling a dead time of a secondary side of a power converter, and particularly to a method that can ensure that a primary side and a secondary side of an alternating current (AC)/direct current (DC) power converter are not simultaneously turned on when a frequency of a control signal of a power switch of the primary side of the AC/DC power converter is suddenly changed.

2. Description of the Prior Art

Generally speaking, conversion efficiency of a switching alternating AC/DC power converter is better than conversion efficiency of a non-switching AC/DC power converter, but a primary side and a secondary side of the switching AC/DC power converter can not be simultaneously turned on to prevent the switching AC/DC power converter from being burned. When a frequency of a control signal of a power switch of the primary side of the switching AC/DC power converter is not suddenly changed, the primary side and the secondary side of the switching AC/DC power converter are not simultaneously turned on. However, if the frequency of the control signal of the power switch of the primary side of the switching AC/DC power converter is suddenly changed, the primary side and the secondary side of the switching AC/DC power converter may be simultaneously turned on, resulting in the switching AC/DC power converter being burned. Therefore, how to ensure that the primary side and the secondary side of the switching AC/DC power converter are not simultaneously turned on when the switching AC/DC power converter operates has become an important issue of a designer of a synchronous rectifier applied to the secondary side of the switching AC/DC power.

SUMMARY OF THE INVENTION

An embodiment of the present invention provides a method for controlling a dead time of a secondary side of a power converter. The method includes giving a previous first turning-on time and a current first turning-on time corresponding to a primary side of the power converter; generating a first voltage and a second voltage according to the previous first turning-on time and the current first turning-on time, respectively; generating a current first target voltage according to the first voltage, the second voltage, and an ideal voltage corresponding to a previous ideal second turning-on time of the secondary side; and determining a current second turning-on time of the secondary side according to a first ramp voltage corresponding to a current ideal second turning-on time of the secondary side and the current first target voltage, wherein a difference between the current second turning-on time and the current ideal second turning-on time is a current dead time of the secondary side; wherein when the first voltage is not equal to the second voltage, the current dead time is not equal to a previous dead time of the secondary side.

Another embodiment of the present invention provides a method for controlling a dead time of a secondary side of a power converter. The method includes giving a previous ideal turning-on time and a current ideal turning-on time corresponding to the secondary side of the power converter; generating a first voltage and a second voltage according to the previous ideal turning-on time and the current ideal turning-on time, respectively; generating a next target voltage according to the first voltage and the second voltage; and determining a next turning-on time of the secondary side according to a ramp voltage corresponding to a next ideal turning-on time of the secondary side and the next target voltage, wherein a difference between the next turning-on time and the next ideal turning-on time is equal to a next dead time of the secondary side; wherein when the first voltage is different from the second voltage, the next dead time is not equal to a current dead time of the secondary side.

Another embodiment of the present invention provides a method for controlling a dead time of a secondary side of a power converter. The method includes generating a next target voltage according to a detection voltage corresponding to a current output voltage of the secondary side, a reference voltage, and an ideal voltage corresponding to a current ideal turning-on time of the secondary side; and determining a next turning-on time of the secondary side according to a ramp voltage corresponding to a next ideal turning-on time of the secondary side and the next target voltage, wherein a difference between the next turning-on time and the next ideal turning-on time is equal to a next dead time of the secondary side.

The present invention provides a method for controlling a dead time of a secondary side of a power converter. The method can reduce a turning-on time of agate control signal of a synchronization switch of the secondary side of the power converter to ensure that a primary side and the secondary side of the power converter are not simultaneously turned on when a difference between a previous first turning-on time and a current first turning-on time of a synchronization signal is greater than a first predetermined value, a difference between a previous ideal second turning-on time and a current ideal second turning-on time of an ideal turning-on signal is greater than a second predetermined value, or a difference between a detection voltage corresponding to an output voltage of the secondary side of the power converter and a reference voltage is greater than a third predetermined value. In addition, when a load coupled to the secondary side of the power converter is heavier, the present invention can also compensate an output current of the secondary side of the power converter by turning on a compensation switch to respond to the heavier load coupled to the secondary side of the power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
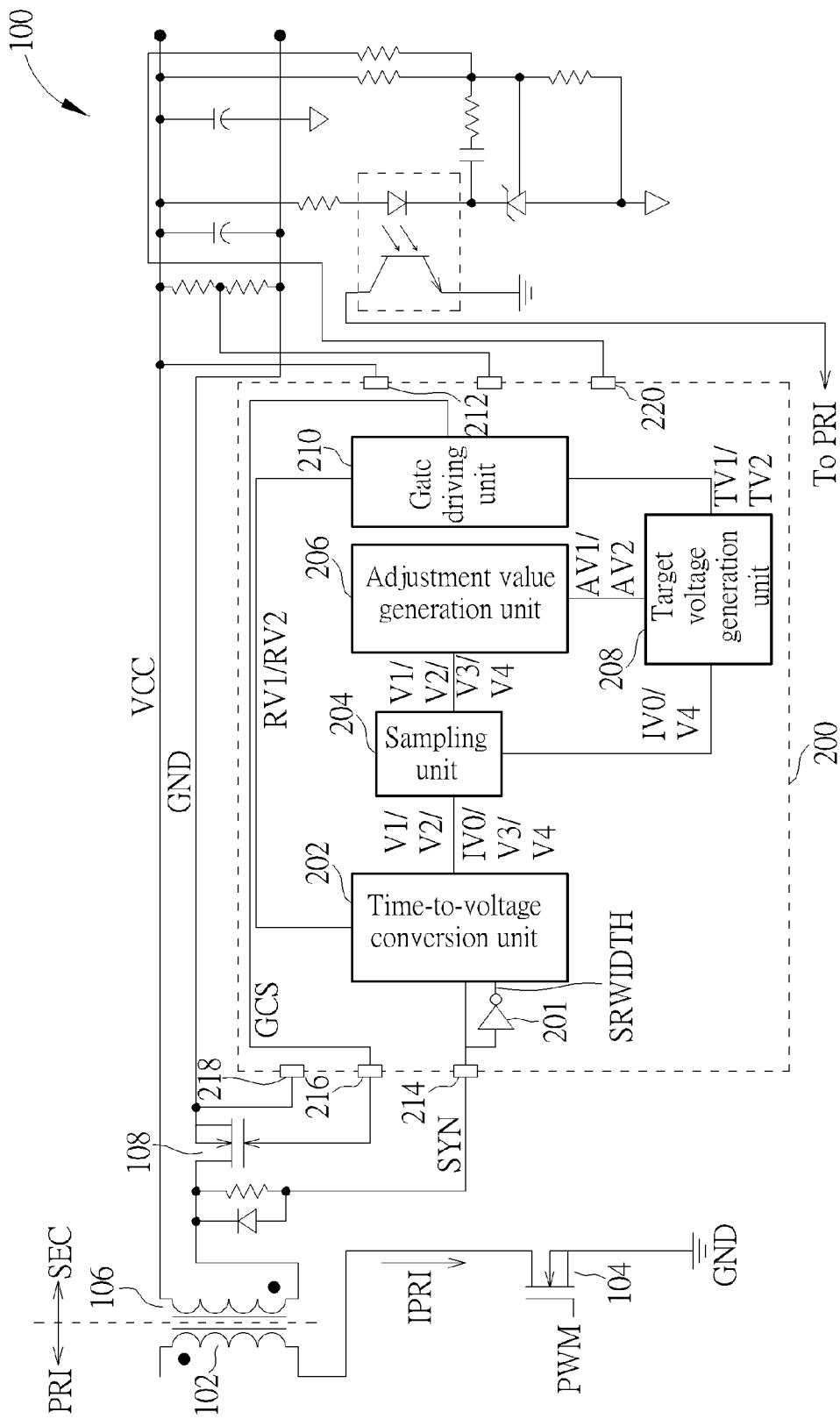
FIG. 1 is a diagram illustrating a synchronous rectifier for controlling a dead time of a secondary side of a power converter according to a first embodiment of the present invention.
Figure 2:
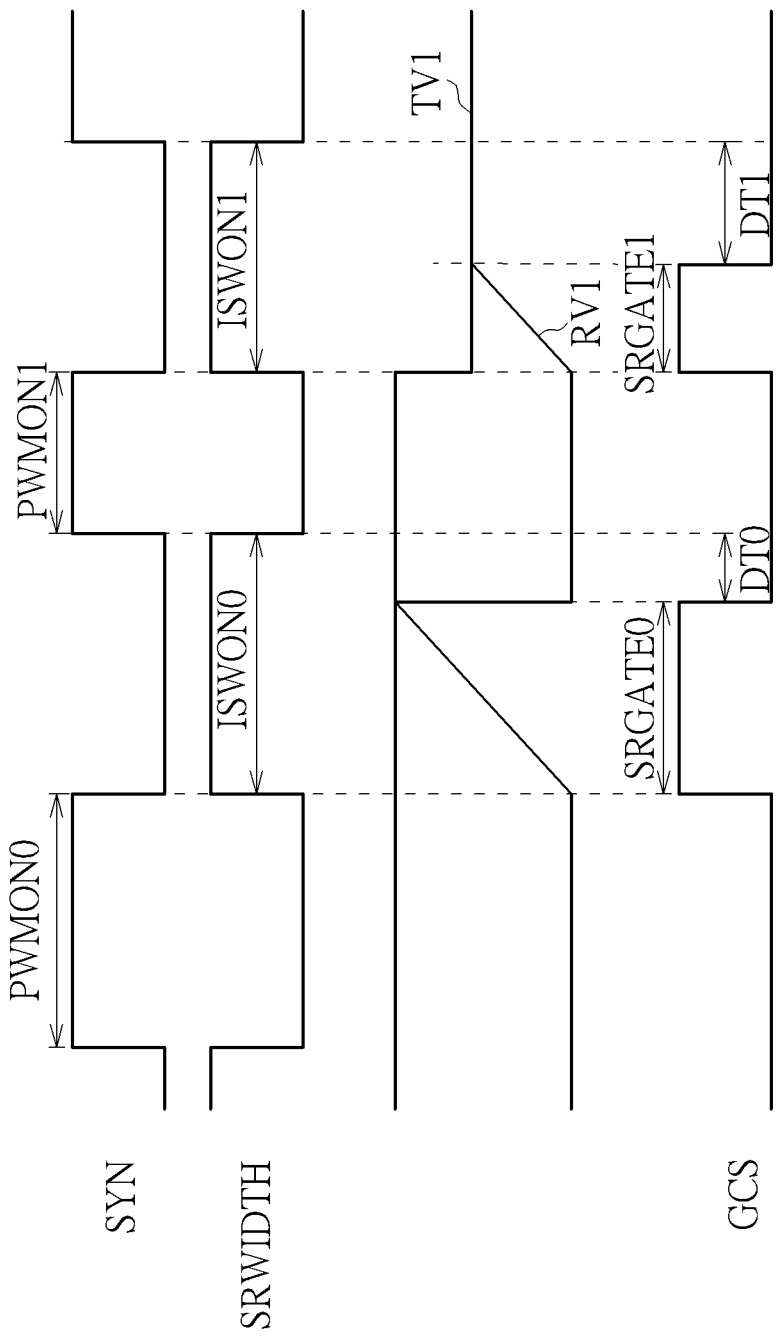
FIG. 2 is a diagram illustrating a synchronization signal, an ideal turning-on signal, a first ramp voltage, a current first target voltage, and a gate control signal.

Please refer to FIG. 1. FIG. 1 is a diagram illustrating a synchronous rectifier 200 for controlling a dead time of a secondary side SEC of a power converter 100 according to a first embodiment of the present invention, wherein a primary side PRI of the power converter 100 only shows a primary side winding 102 and a power switch 104, and the power converter 100 is an alternating current/direct current power converter. As shown in FIG. 1, the synchronous rectifier 200 includes an inverter 201, a time-to-voltage conversion unit 202, a sampling unit 204, an adjustment value generation unit 206, a target voltage generation unit 208, and a gate driving unit 210, wherein an output voltage VCC of the secondary side SEC of the power converter 100 drives the synchronous rectifier 200 through a pin 212 of the synchronous rectifier 200. As shown in FIG. 1, when the power switch 104 is turned on, a secondary side winding 106 of the secondary side SEC of the power converter 100 can generate a synchronization signal SYN according to a current IPRI flowing through the primary side PRI of the power converter 100. As shown in FIG. 1, the time-to-voltage conversion unit 202 can receive the synchronization signal SYN through a pin 214 of the synchronous rectifier 200, wherein the synchronization signal SYN includes a previous first turning-on time PWMON0 and a current first turning-on time PWMON1 corresponding to the primary side PRI of the power converter 100 (as shown in FIG. 2). In addition, as shown in FIG. 1, the inverter 201 is used for reversing the synchronization signal SYN to generate an ideal turning-on signal SRWIDTH corresponding to a synchronization switch 108 of the secondary side SEC of the power converter 100, wherein as shown in FIG. 2, the ideal turning-on signal SRWIDTH includes a previous ideal second turning-on time ISWON0 and a current ideal second turning-on time ISWON1, and the ideal turning-on signal SRWIDTH corresponds to a discharge time of the secondary side SEC of the power converter 100, wherein the previous ideal second turning-on time ISWON0 and the current ideal second turning-on time ISWON1 correspond to an ideal turning-on time of the synchronization switch 108 of the secondary side SEC of the power converter 100. The time-to-voltage conversion unit 202 can generate a first voltage V1 (corresponding to the previous first turning-on time PWMON0) and a second voltage V2 (corresponding to the current first turning-on time PWMON1) according to the previous first turning-on time PWMON0 and the current first turning-on time PWMON1, respectively, generate an ideal voltage IV0 corresponding to the previous ideal second turning-on time ISWON0 according to the previous ideal second turning-on time ISWON0, and generate a first ramp voltage RV1 corresponding to the current ideal second turning-on time ISWON1 according to the current ideal second turning-on time ISWON1. As shown in FIG. 1, when a difference between the first voltage V1 and the second voltage V2 sampled by the sampling unit 204 is greater than a first predetermined value, the adjustment value generation unit 206 can generate a current first adjustment value AV1 according to the difference between the first voltage V1 and the second voltage V2, wherein the current first adjustment value AV1 is a fixed value or an adjustable value. That is to say, when the difference between the first voltage V1 and the second voltage V2 is less than or equal to the first predetermined value, the adjustment value generation unit 206 outputs a previous first adjustment value outputted by the adjustment value generation unit 206, rather than generating the current first adjustment value AV1. The target voltage generation unit 208 is coupled to the adjustment value generation unit 206 and the sampling unit 204 for generating a current first target voltage TV1 according to the ideal voltage IV0 corresponding to the previous ideal second turning-on time ISWON0 and the current first adjustment value AV1. That is to say, the target voltage generation unit 208 utilizes the ideal voltage IV0 corresponding to the previous ideal second turning-on time ISWON0 minus the current first adjustment value AV1 to generate the current first target voltage TV1. In addition, when the difference between the first voltage V1 and the second voltage V2 is less than or equal to the first predetermined value, the adjustment value generation unit 206 outputs the previous first adjustment value. Meanwhile, the target voltage generation unit 208 generates the current first target voltage TV1 according to the ideal voltage IV0 corresponding to the previous ideal second turning-on time ISWON0 and the previous first adjustment value outputted by the adjustment value generation unit 206. As shown in FIG. 1, the gate driving unit 210 is coupled to the time-to-voltage conversion unit 202 and the target voltage generation unit 208 for determining a current second turning-on time SRGATE1 of a gate control signal GCS of the secondary side SEC of the power converter 100 according to the first ramp voltage RV1 corresponding to the current ideal second turning-on time ISWON1 and the current first target voltage TV1, wherein the gate control signal GCS is transmitted to a gate of the synchronization switch 108 of the secondary side SEC of the power converter 100 through a pin 216 of the synchronous rectifier 200, and the synchronization switch 108 can be turned on and turned off according to the gate control signal GCS. In addition, as shown in FIG. 1, a pin 218 of the synchronous rectifier 200 is electrically connected to ground GND.

As shown in FIG. 2, a current dead time DT1 of the secondary side SEC of the power converter 100 is equal to a difference between the current second turning-on time SRGATE1 and the current ideal second turning-on time ISWON1. In addition, as shown in FIG. 2, when the first voltage V1 is greater than the second voltage V2 (that is, the previous first turning-on time PWMON0 is greater than the current first turning-on time PWMON1 and the difference between the first voltage V1 and the second voltage V2 is greater than the first predetermined value), the synchronous rectifier 200 can make the current second turning-on time SRGATE1 be less than the previous second turning-on time SRGATE0 of the secondary side SEC of the power converter 100. That is to say, the current dead time DT1 is greater than a previous dead time DT0 of the secondary side SEC of the power converter 100, wherein a relationship between the current second turning-on time SRGATE1 and the previous second turning-on time SRGATE0 is determined by equation (1):

$$SRGATE1 = SRGATE0 - P * \Delta PWMON \qquad (1)$$

As shown in equation(1), $\Delta$PWMON is a difference between the previous first turning-on time PWMON0 and the current first turning-on time PWMON1, P is a predetermined proportion, wherein P is greater than 1, and P corresponds to a turns ratio of the primary side winding 102 to the secondary side winding 106.

In addition, although FIG. 2 takes the previous first turning-on time PWMON0 being greater than the current first turning-on time PWMON1 as an example, but the present invention is not limited to the previous first turning-on time PWMON0 being greater than the current first turning-on time PWMON1. That is to say, when the previous first turning-on time PWMON0 is less than the current first turning-on time PWMON1, resulting in the difference between the first voltage V1 and the second voltage V2 being greater than the first predetermined value, the synchronous rectifier 200 also makes the current second turning-on time SRGATE1 be less than the previous second turning-on time SRGATE0 of the secondary side SEC of the power converter 100 to ensure that the primary side PRI and the secondary side SEC of the power converter 100 are not simultaneously turned on according to the above mentioned operational principles of the synchronous rectifier 200.

Figure 3:
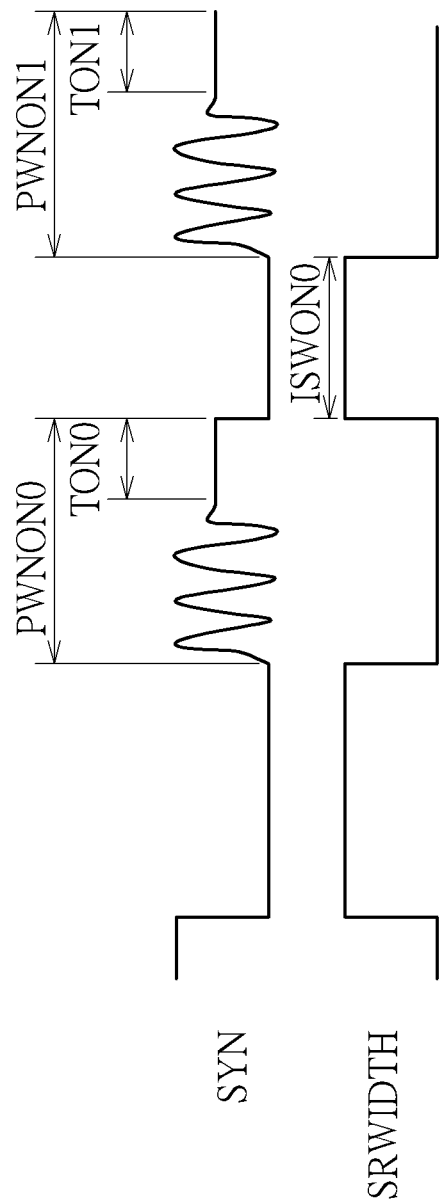
FIG. 3 is a diagram illustrating the synchronization signal, the ideal turning-on signal, and a turning-on time of the power switch when the power converter is in a discrete current mode and a quasi resonant mode.

In addition, as shown in FIG. 2, when the power converter 100 is in a continuous current mode (CCM), the previous first turning-on time PWMON0 and the current first turning-on time PWMON1 are equal to a turning-on time of the power switch 104 of the primary side PRI of the power converter 100. When the power converter 100 is in a discrete current mode (DCM) and a quasi resonant mode, the previous first turning-on time PWMON0 and the current first turning-on time PWMON1 are greater than the turning-on time of the power switch 104 of the primary side PRI of the power converter 100. For example, as shown in FIG. 3, the previous first turning-on time PWMON0 is greater than a turning-on time TON0 of the power switch 104, and the current first turning-on time PWMON1 greater than a turning-on time TON1 of the power switch 104.

Figure 4:
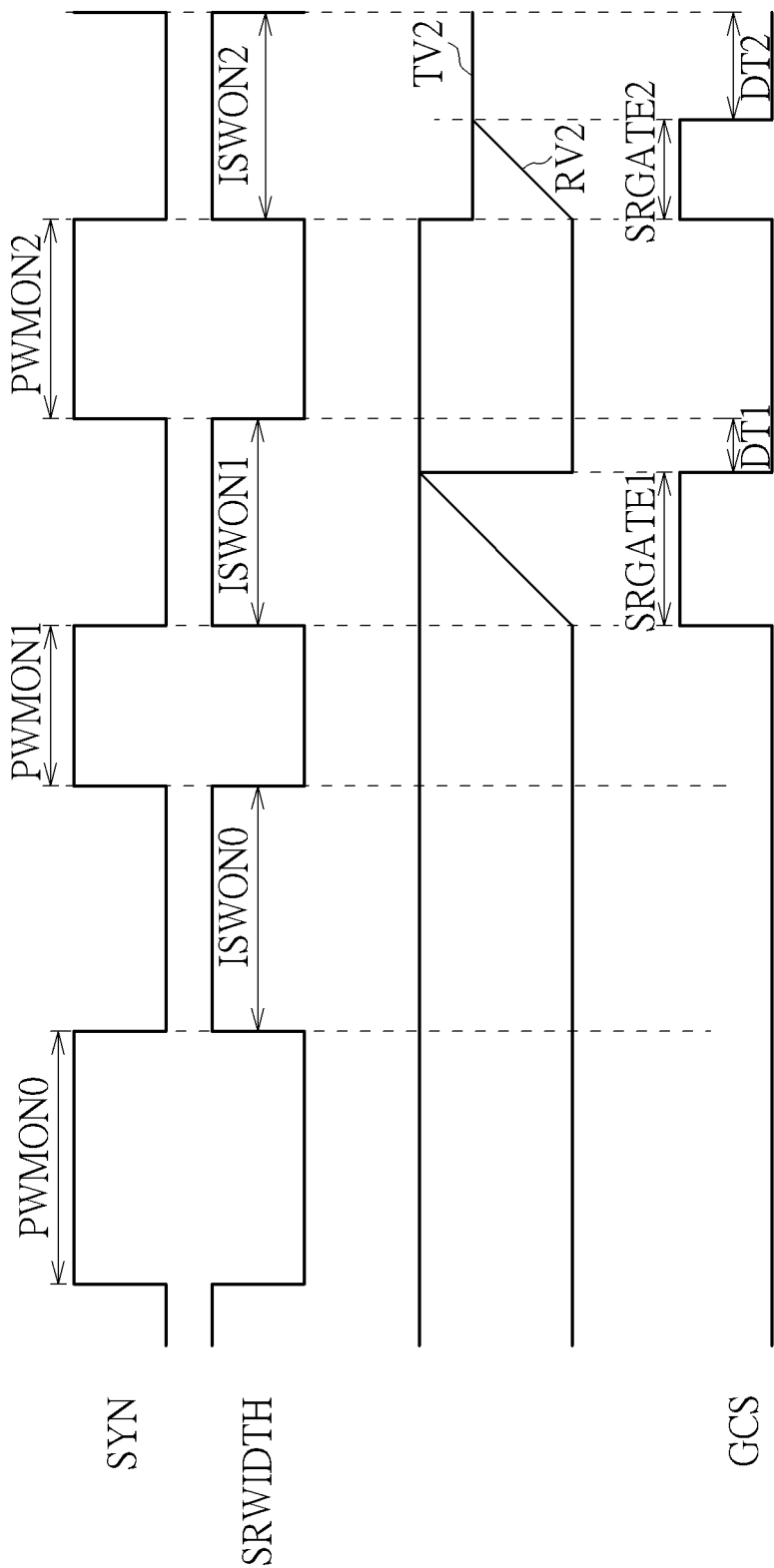
FIG. 4 is a diagram illustrating the ideal turning-on signal, a second ramp voltage corresponding to a next ideal second turning-on time of the secondary side of the power converter, and a next second target voltage determining a next turning-on time of the secondary side of the power converter when the synchronous rectifier utilizes the ideal turning-on signal corresponding to the secondary side of the power converter to control a dead time of the secondary side of the power converter according to a secondary embodiment of the present invention.

Please refer to FIG. 4. FIG. 4 is a diagram illustrating the ideal turning-on signal SRWIDTH, a second ramp voltage RV2 corresponding to a next ideal second turning-on time ISWON2 of the secondary side SEC of the power converter 100, and a next second target voltage TV2 determining a next turning-on time SRGATE2 of the secondary side SEC of the power converter 100 when the synchronous rectifier 200 utilizes the ideal turning-on signal SRWIDTH corresponding to the secondary side SEC of the power converter 100 to control a dead time of the secondary side SEC of the power converter 100 according to a secondary embodiment of the present invention. As shown in FIG. 4, the ideal turning-on signal SRWIDTH includes the previous ideal second turning-on time ISWON0, the current ideal second turning-on time ISWON1, and the next ideal second turning-on time ISWON2, wherein the previous ideal second turning-on time ISWON0, the current ideal second turning-on time ISWON1, and the next ideal second turning-on time ISWON2 correspond to the ideal turning-on time of the synchronization switch 108 of the secondary side SEC of the power converter 100. After the time-to-voltage conversion unit 202 receives the ideal turning-on signal SRWIDTH, the time-to-voltage conversion unit 202 can generate a third voltage V3 (corresponding to the previous ideal second turning-on time ISWON0) and a fourth voltage V4 (corresponding to the current ideal second turning-on time ISWON1) according to the previous ideal second turning-on time ISWON0 and the current ideal second turning-on time ISWON1, respectively, and generate the second ramp voltage RV2 corresponding to the next ideal second turning-on time ISWON2 according to the next ideal second turning-on time ISWON2. As shown in FIG. 4, when a difference between the third voltage V3 and the fourth voltage V4 sampled by the sampling unit 204 is greater than a second predetermined value, the adjustment value generation unit 206 can generate a next second adjustment value AV2 according to the difference between the third voltage V3 and the fourth voltage V4, wherein the next second adjustment value AV2 is a fixed value or an adjustable value. In addition, when the difference between the third voltage V3 and the fourth voltage V4 is less than or equal to the second predetermined value, the adjustment value generation unit 206 outputs a previous second adjustment value outputted by the adjustment value generation unit 206, rather than generating the next second adjustment value AV2. The target voltage generation unit 208 can generate the next second target voltage TV2 according to the fourth voltage V4 corresponding to the current ideal second turning-on time ISWON1 and the next second adjustment value AV2. That is to say, the target voltage generation unit 208 utilizes the fourth voltage V4 corresponding to the current ideal second turning-on time ISWON1 minus the next second adjustment value AV2 to generate the next second target voltage TV2. In addition, when the difference between the third voltage V3 and the fourth voltage V4 is less than or equal to the second predetermined value, the adjustment value generation unit 206 outputs the previous second adjustment value. Meanwhile, the target voltage generation unit 208 generates the next second target voltage TV2 according to the fourth voltage V4 corresponding to the current ideal second turning-on time ISWON1 and the previous second adjustment value outputted by the adjustment value generation unit 206. As shown in FIG. 4, the gate driving unit 210 can determine a next second turning-on time SRGATE2 of the gate control signal GCS of the secondary side SEC of the power converter 100 according to the second ramp voltage RV2 corresponding to the next ideal second turning-on time ISWON2 and the next second target voltage TV2, wherein the synchronization switch 108 can be turned on and turned off according to the gate control signal GCS. In addition, as shown in FIG. 4, a next dead time DT2 of the secondary side SEC of the power converter 100 is equal to a difference between the next second turning-on time SRGATE2 and the next ideal second turning-on time ISWON2.

As shown in FIG. 4, when the third voltage V3 is greater than the fourth voltage V4 (that is, the previous ideal second turning-on time ISWON0 is greater than the current ideal second turning-on time ISWON1 and the difference between the third voltage V3 and the fourth voltage V4 is greater than the second predetermined value), the synchronous rectifier 200 can make the next second turning-on time SRGATE2 be less than the current second turning-on time SRGATE1 of the secondary side SEC of the power converter 100. That is to say, the next dead time DT2 is greater than the current dead time DT1 of the secondary side SEC of the power converter 100.

In addition, although FIG. 4 takes the previous ideal second turning-on time ISWON0 being greater than the current ideal second turning-on time ISWON1, but the present invention is not limited to the previous ideal second turning-on time ISWON0 being greater than the current ideal second turning-on time ISWON1. That is to say, when the previous ideal second turning-on time ISWON0 is less than the current ideal second turning-on time ISWON1, resulting in the difference between the third voltage V3 and the fourth voltage V4 being greater than the second predetermined value, the synchronous rectifier 200 also makes the next second turning-on time SRGATE2 be less than current second turning-on time SRGATE1 to ensure that the primary side PRI and the secondary side SEC of the power converter 100 are not simultaneously turned on according to the above mentioned operational principles of the synchronous rectifier 200.

Figure 5:
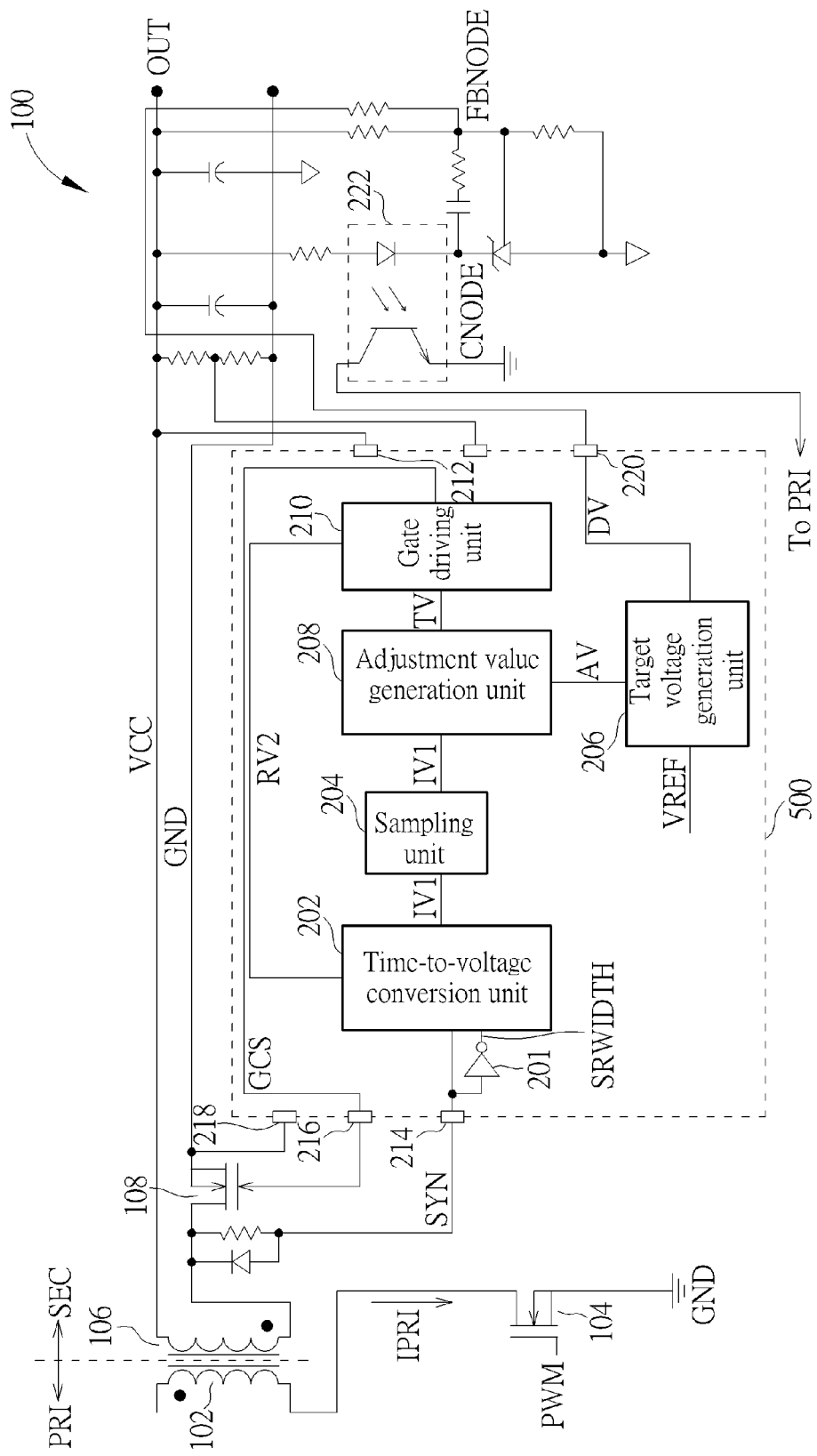
FIG. 5 is a diagram illustrating a synchronous rectifier for controlling the dead time of the secondary side of a power converter according to a third embodiment of the present invention.

Please refer to FIG. 5. FIG. 5 is a diagram illustrating a synchronous rectifier 500 for controlling the dead time of the secondary side SEC of a power converter 100 according to a third embodiment of the present invention. As shown in FIG. 5, the time-to-voltage conversion unit 202 can generate an ideal voltage IV1 corresponding to the current ideal second turning-on time ISWON1 according to the current ideal second turning-on time ISWON1, and generate the second ramp voltage RV2 corresponding to the next ideal second turning-on time ISWON2 according to the next ideal second turning-on time ISWON2. As shown in FIG. 5, the adjustment value generation unit 206 can receive a detection voltage DV corresponding to the output voltage VCC of the secondary side SEC of the power converter 100 through a pin 220 of the synchronous rectifier 500, and generate a current adjustment value AV according to the detection voltage DV and a reference voltage VREF, wherein the current adjustment value AV is a fixed value or an adjustable value. That is to say, when the detection voltage DV is changed (e.g. the detection voltage DV is increased or decreased), resulting in a difference between the detection voltage DV and the reference voltage VREF being greater than a third predetermined value, the adjustment value generation unit 206 can generate the current adjustment value AV according to the difference between the detection voltage DV and the reference voltage VREF. In addition, when the difference between the detection voltage DV and the reference voltage VREF is less than or equal to the third predetermined value, the adjustment value generation unit 206 outputs a previous adjustment value outputted by the adjustment value generation unit 206, rather than generating the current adjustment value AV. In addition, the detection voltage DV is equal to a voltage of a node FBNODE coupled to an output terminal OUT of the secondary side SEC of the power converter 100, or equal to a voltage of a node CNODE coupled to a photocoupler 222 of the secondary side SEC of the power converter 100. As shown in FIG. 5, after the adjustment value generation unit 206 generates the current adjustment value AV, the target voltage generation unit 208 can generate a next target voltage TV according to the ideal voltage IV1 corresponding to the current ideal turning-on time ISWON1 of the secondary side SEC of the power converter 100 and the current adjustment value AV. In addition, when the difference between the detection voltage DV and the reference voltage VREF is less than or equal to the third predetermined value, the adjustment value generation unit 206 outputs the previous adjustment value outputted by the adjustment value generation unit 206. Meanwhile, the target voltage generation unit 208 generates the next target voltage TV according to the ideal voltage IV1 corresponding to the current ideal turning-on time ISWON1 of the secondary side SEC of the power converter 100 and the previous adjustment value outputted by the adjustment value generation unit 206. As shown in FIG. 5, after the target voltage generation unit 208 generates the next target voltage TV, the gate driving unit 210 can determine the next second turning-on time SRGATE2 of the gate control signal GCS of the secondary side SEC of the power converter 100 according to the second ramp voltage RV2 corresponding to the next ideal second turning-on time ISWON2 and the next target voltage TV, wherein waveforms of the synchronization signal SYN, the ideal turning-on signal SRWIDTH, the gate control signal GCS, the next target voltage TV, and the second ramp voltage RV2 can refer to FIG. 4, so further description thereof is omitted for simplicity.

Because the adjustment value generation unit 206 can generate the current adjustment value AV when the detection voltage DV is changed (e.g. the detection voltage DV is increased or decreased), resulting in the difference between the detection voltage DV and the reference voltage VREF being greater than the third predetermined value, the synchronous rectifier 500 can make the next second turning-on time SRGATE2 be less than the current second turning-on time SRGATE1 (that is, the next dead time DT2 is greater than the current dead time DT1) to ensure that the primary side PRI and the secondary side SEC of the power converter 100 are not simultaneously turned on.

Figure 6:
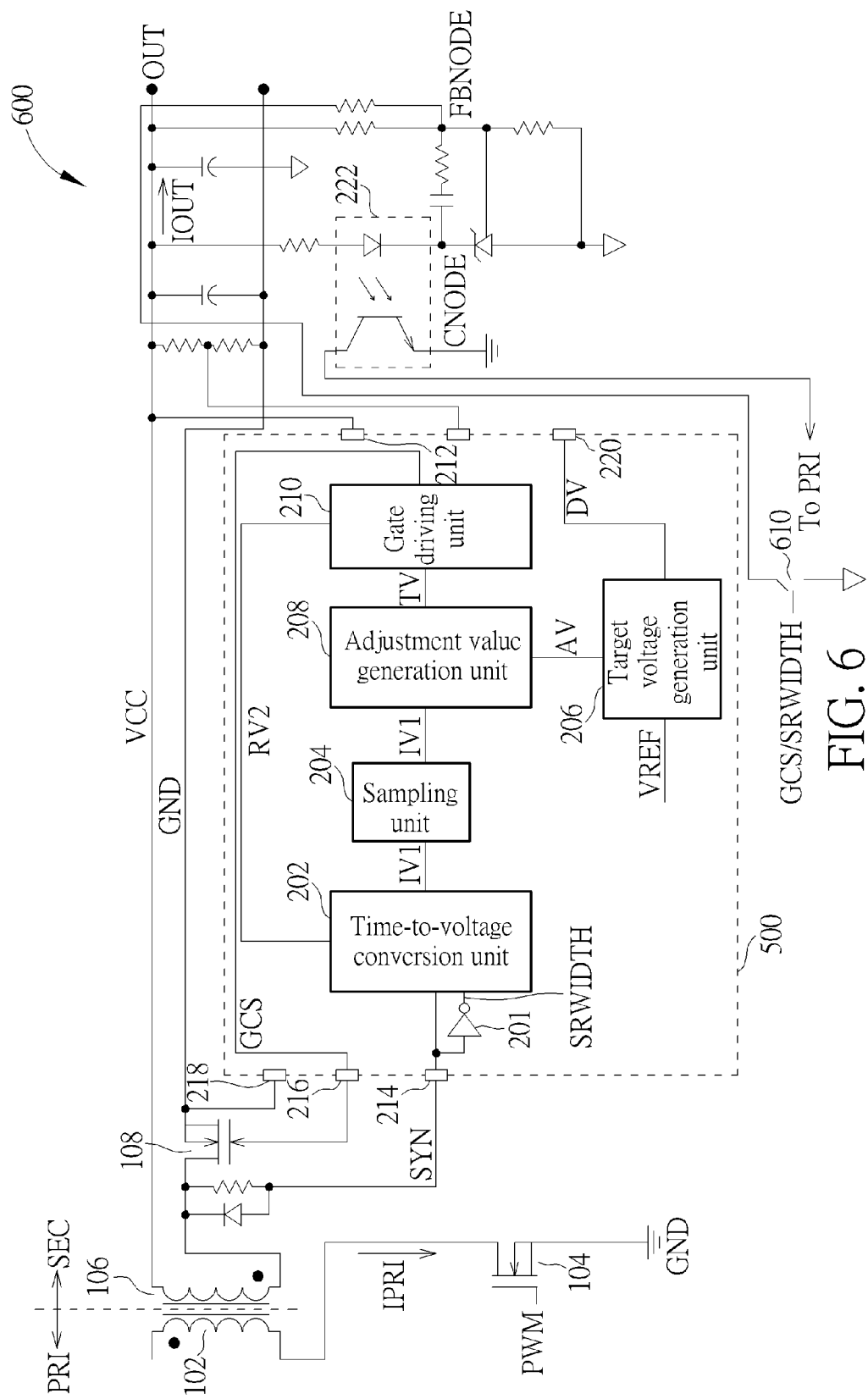
FIG. 6 is a diagram illustrating a synchronous rectifier applied to a secondary side of a power converter utilizing a compensation switch included in the power converter to compensate an output current of the secondary side of the power converter according to a fourth embodiment of the present invention.

Please refer to FIG. 6. FIG. 6 is a diagram illustrating a synchronous rectifier applied to a secondary side SEC of a power converter 600 utilizing a compensation switch 610 included in the power converter 600 to compensate an output current IOUT of the secondary side SEC of the power converter 600 according to a fourth embodiment of the present invention. As shown in FIG. 6, a difference between the power converter 600 and the power converter 500 is that the power converter 600 further includes the compensation switch 610, wherein the synchronous rectifier applied to the secondary side SEC of the power converter 600 can be the synchronous rectifier 200 shown in FIG. 1 or the synchronous rectifier 500 shown in FIG. 5. As shown in FIG. 6, when a load coupled to the secondary side SEC of the power converter 600 is heavier, the synchronous rectifier applied to the secondary side SEC of the power converter 600 can utilize the gate control signal GCS of the synchronization switch 108 of the secondary side SEC of the power converter 600 or the ideal turning-on signal SRWIDTH corresponding to the synchronization switch 108 of the secondary side SEC of the power converter 600 to turn on the compensation switch 610 to compensate the output current IOUT of the secondary side SEC of the power converter 600. As shown in FIG. 6, when the compensation switch 610 is turned on according to the gate control signal GCS of the synchronization switch 108 of the secondary side SEC of the power converter 600 or the ideal turning-on signal SRWIDTH corresponding to the synchronization switch 108 of the secondary side SEC of the power converter 600, the voltage of the node FBNODE is decreased, resulting in the output voltage VCC of the secondary side SEC of the power converter 600 being decreased. Because the output voltage VCC of the secondary side SEC of the power converter 600 is decreased, the primary side PRI of the power converter 600 can transfer more power to the load coupled to the secondary side SEC of the power converter 600. In addition, in another embodiment of the present invention, when the load coupled to the secondary side SEC of the power converter 600 is heavier, the synchronous rectifier applied to the secondary side SEC of the power converter 600 can utilize a control signal PWM of the power switch 104 of the primary side PRI of the power converter 600 to turn on the compensation switch 610 to compensate the output current IOUT of the secondary side SEC of the power converter 600. Further, subsequent operational principles of the power converter 600 are the same as those of the power converter 500, so further description thereof is omitted for simplicity.

Figure 7:
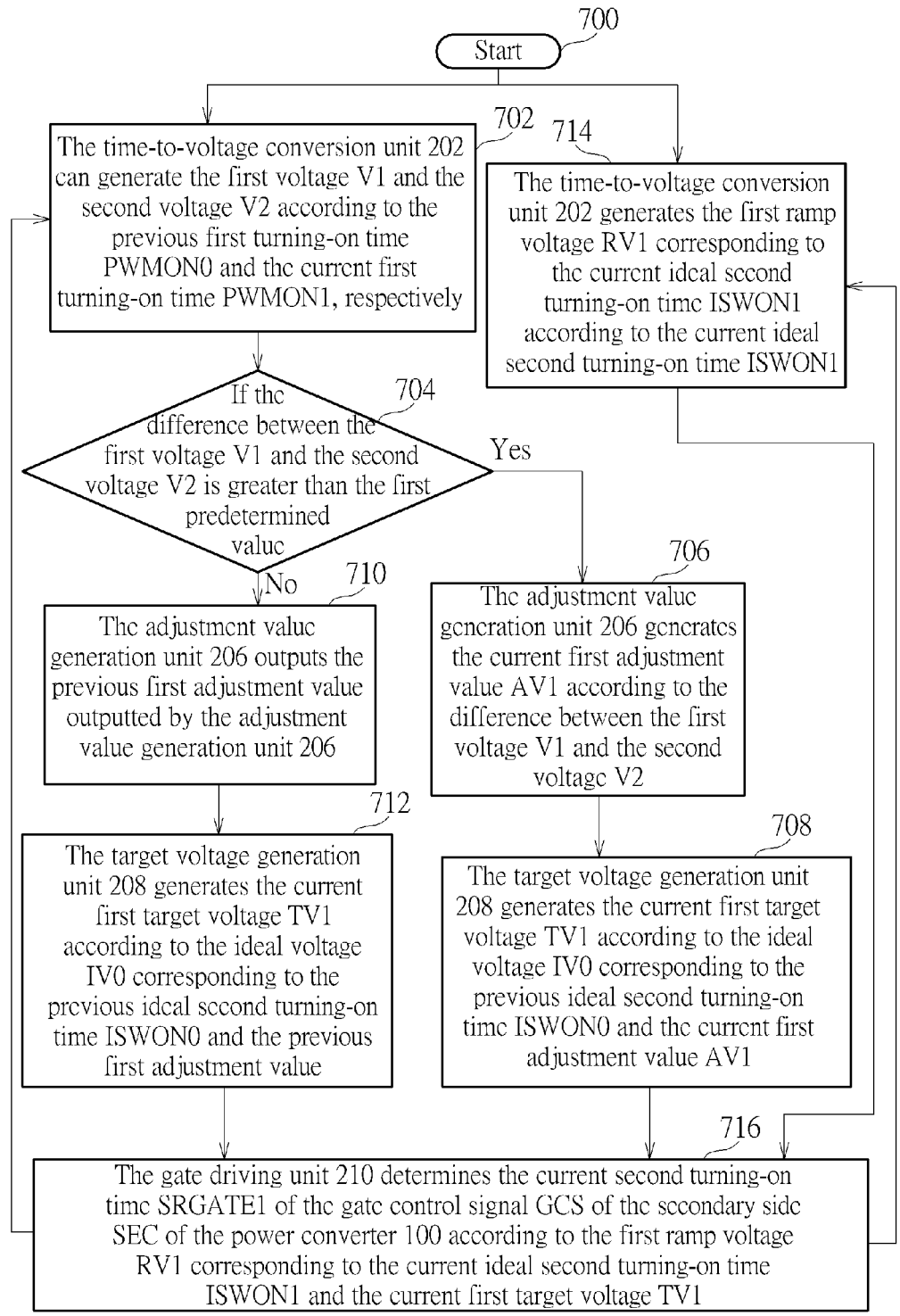
FIG. 7 is a flowchart illustrating a method for controlling a dead time of a secondary side of a power converter according to a fifth embodiment.

Please refer to FIGS. 1, 2, 7. FIG. 7 is a flowchart illustrating a method for controlling a dead time of a secondary side of a power converter according to a fifth embodiment. The method in FIG. 7 is illustrated using the power converter 100 and the synchronous rectifier 200 in FIG. 1. Detailed steps are as follows:

Step 700: Start.

Step 702: The time-to-voltage conversion unit 202 can generate the first voltage V1 and the second voltage V2 according to the previous first turning-on time PWMON0 and the current first turning-on time PWMON1, respectively.

Step 704: If the difference between the first voltage V1 and the second voltage V2 is greater than the first predetermined value; if yes, go to Step 706; if no, go to Step 710.

Step 706: The adjustment value generation unit 206 generates the current first adjustment value AV1 according to the difference between the first voltage V1 and the second voltage V2.

Step 708: The target voltage generation unit 208 generates the current first target voltage TV1 according to the ideal voltage IV0 corresponding to the previous ideal second turning-on time ISWON0 and the current first adjustment value AV1, go to Step 716.

Step 710: The adjustment value generation unit 206 outputs the previous first adjustment value outputted by the adjustment value generation unit 206.

Step 712: The target voltage generation unit 208 generates the current first target voltage TV1 according to the ideal voltage IV0 corresponding to the previous ideal second turning-on time ISWON0 and the previous first adjustment value, go to Step 716.

Step 714: The time-to-voltage conversion unit 202 generates the first ramp voltage RV1 corresponding to the current ideal second turning-on time ISWON1 according to the current ideal second turning-on time ISWON1, go to Step 716.

Step 716: The gate driving unit 210 determines the current second turning-on time SRGATE1 of the gate control signal GCS of the secondary side SEC of the power converter 100 according to the first ramp voltage RV1 corresponding to the current ideal second turning-on time ISWON1 and the current first target voltage TV1, go to Step 702 and Step 714.

As shown in FIG. 1, the time-to-voltage conversion unit 202 can receive the synchronization signal SYN through the pin 214 of the synchronous rectifier 200, wherein synchronization signal SYN includes the previous first turning-on time PWMON0 and the current first turning-on time PWMON1 corresponding to the primary side PRI of the power converter 100 (as shown in FIG. 2). In addition, as shown in FIG. 1, the inverter 201 is used for reversing the synchronization signal SYN to generate the ideal turning-on signal SRWIDTH corresponding to the synchronization switch 108 of the secondary side SEC of the power converter 100, wherein as shown in FIG. 2, the ideal turning-on signal SRWIDTH includes the previous ideal second turning-on time ISWON0 and the current ideal second turning-on time ISWON1, and the ideal turning-on signal SRWIDTH corresponds to the discharge time of the secondary side SEC of the power converter 100, wherein the previous ideal second turning-on time ISWON0 and the current ideal second turning-on time ISWON1 correspond to the ideal turning-on time of the synchronization switch 108 of the secondary side SEC of the power converter 100. In Step 702 and Step 714, the time-to-voltage conversion unit 202 can generate the first voltage V1 (corresponding to the previous first turning-on time PWMON0) and the second voltage V2 (corresponding to the current first turning-on time PWMON1) according to the previous first turning-on time PWMON0 and the current first turning-on time PWMON1, respectively, generate the ideal voltage IV0 corresponding to the previous ideal second turning-on time ISWON0 according to the previous ideal second turning-on time ISWON0, and generate the first ramp voltage RV1 corresponding to the current ideal second turning-on time ISWON1 according to the current ideal second turning-on time ISWON1. In Step 706, when the first voltage V1 is greater than the second voltage V2 sampled by the sampling unit 204 (that is, the previous first turning-on time PWMON0 is greater than current first turning-on time PWMON1 and the difference between the first voltage V1 and the second voltage V2 is greater than the first predetermined value), the adjustment value generation unit 206 can generate the current first adjustment value AV1 according to the difference between the first voltage V1 and the second voltage V2, wherein the current first adjustment value AV1 is a fixed value or an adjustable value. That is to say, when the difference between the first voltage V1 and the second voltage V2 is less than or equal to the first predetermined value, the adjustment value generation unit 206 does not generate the current first adjustment value AV1. In Step 708, the target voltage generation unit 208 can utilize the ideal voltage IV0 corresponding to the previous ideal second turning-on time ISWON0 minus the current first adjustment value AV1 to generate the current first target voltage TV1. In addition, in Step 710, when the difference between the first voltage V1 and the second voltage V2 is less than or equal to the first predetermined value, the adjustment value generation unit 206 outputs the previous first adjustment value outputted by the adjustment value generation unit 206, rather than generating the current first adjustment value AV1. In Step 712, when the difference between the first voltage V1 and the second voltage V2 is less than or equal to the first predetermined value, the target voltage generation unit 208 generates the current first target voltage TV1 according to the ideal voltage IV0 corresponding to the previous ideal second turning-on time ISWON0 and the previous first adjustment value outputted by the adjustment value generation unit 206. In Step 716, as shown in FIGS. 1, 2, the gate driving unit 210 can determine the current second turning-on time SRGATE1 of the gate control signal GCS of the secondary side SEC of the power converter 100 according to the first ramp voltage RV1 corresponding to the current ideal second turning-on time ISWON1 and the current first target voltage TV1, wherein the synchronization switch 108 can be turned on and turned off according to the gate control signal GCS.

As shown in FIG. 2, the current dead time DT1 of the secondary side SEC of the power converter 100 is equal to the difference between the current second turning-on time SRGATE1 and the current ideal second turning-on time ISWON1. In addition, as shown in FIG. 2, when the first voltage V1 is greater than second voltage V2 (that is, the previous first turning-on time PWMON0 is greater than the current first turning-on time PWMON1 and the difference between the first voltage V1 and the second voltage V2 is greater than the first predetermined value), the synchronous rectifier 200 can make the current second turning-on time SRGATE1 be less than previous second turning-on time SRGATE0 of the secondary side SEC of the power converter 100 (that is, the current dead time DT1 is greater than the previous dead time DT0 of the secondary side SEC of the power converter 100) to ensure that the primary side PRI and the secondary side SEC of the power converter 100 are not simultaneously turned on.

Figure 8:
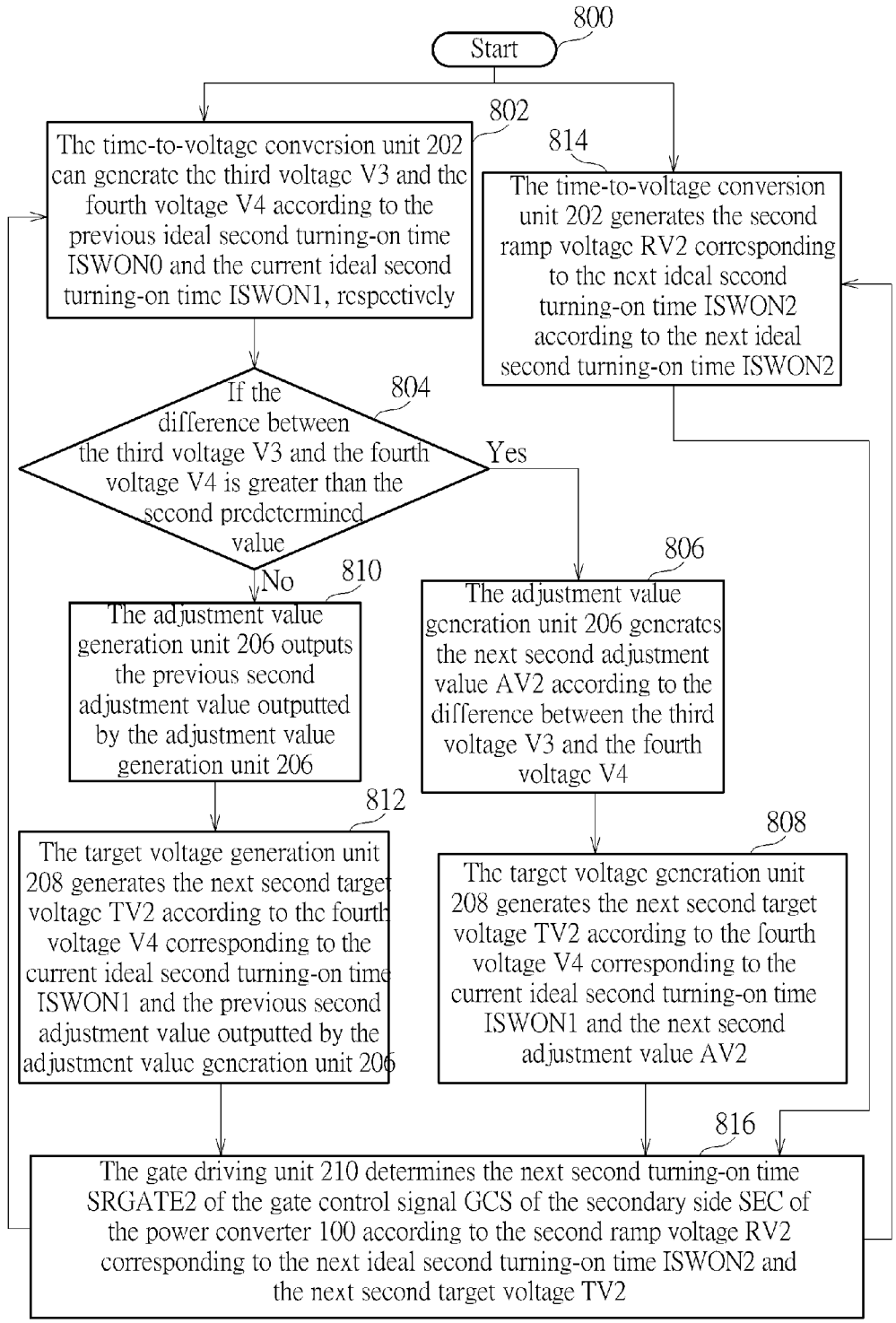
FIG. 8 is a flowchart illustrating a method for controlling a dead time of a secondary side of a power converter according to a sixth embodiment.

Please refer to FIGS. 1, 4, 8. FIG. 8 is a flowchart illustrating a method for controlling a dead time of a secondary side of a power converter according to a sixth embodiment. The method in FIG. 8 is illustrated using the power converter 100 and the synchronous rectifier 200 in FIG. 1. Detailed steps are as follows:

Step 800: Start.

Step 802: The time-to-voltage conversion unit 202 can generate the third voltage V3 and the fourth voltage V4 according to the previous ideal second turning-on time ISWON0 and the current ideal second turning-on time ISWON1, respectively.

Step 804: If the difference between the third voltage V3 and the fourth voltage V4 is greater than the second predetermined value; if yes, go to Step 806; if no, go to Step 810.

Step 806: The adjustment value generation unit 206 generates the next second adjustment value AV2 according to the difference between the third voltage V3 and the fourth voltage V4.

Step 808: The target voltage generation unit 208 generates the next second target voltage TV2 according to the fourth voltage V4 corresponding to the current ideal second turning-on time ISWON1 and the next second adjustment value AV2, go to Step 816.

Step 810: The adjustment value generation unit 206 outputs the previous second adjustment value outputted by the adjustment value generation unit 206.

Step 812: The target voltage generation unit 208 generates the next second target voltage TV2 according to the fourth voltage V4 corresponding to the current ideal second turning-on time ISWON1 and the previous second adjustment value outputted by the adjustment value generation unit 206, go to Step 816.

Step 814: The time-to-voltage conversion unit 202 generates the second ramp voltage RV2 corresponding to the next ideal second turning-on time ISWON2 according to the next ideal second turning-on time ISWON2, go to Step 816.

Step 816: The gate driving unit 210 determines the next second turning-on time SRGATE2 of the gate control signal GCS of the secondary side SEC of the power converter 100 according to the second ramp voltage RV2 corresponding to the next ideal second turning-on time ISWON2 and the next second target voltage TV2, go to Step 802 and Step 814.

In Step 802 and Step 814, as shown in FIG. 4, after the time-to-voltage conversion unit 202 receives the ideal turning-on signal SRWIDTH, the time-to-voltage conversion unit 202 can generate the third voltage V3 (corresponding to the previous ideal second turning-on time ISWON0)and the fourth voltage V4 (corresponding to the current ideal second turning-on time ISWON1) according to the previous ideal second turning-on time ISWON0 and the current ideal second turning-on time ISWON1, respectively, and generate the second ramp voltage RV2 corresponding to the next ideal second turning-on time ISWON2 according to the next ideal second turning-on time ISWON2 corresponding to the secondary side SEC of the power converter 100. In Step 806, when the difference between the third voltage V3 and the fourth voltage V4 sampled by the sampling unit 204 is greater than the second predetermined value, the adjustment value generation unit 206 can generate the next second adjustment value AV2 according to the difference between the third voltage V3 and the fourth voltage V4, wherein the next second adjustment value AV2 is a fixed value or an adjustable value. In Step 808, the target voltage generation unit 208 can utilize the fourth voltage V4 corresponding to the current ideal second turning-on time ISWON1 minus the next second adjustment value AV2 to generate the next second target voltage TV2. In addition, in Step 810, when the difference between the third voltage V3 and the fourth voltage V4 is less than or equal to the second predetermined value, the adjustment value generation unit 206 outputs the previous second adjustment value, rather than generating the next second adjustment value AV2. In Step 812, when the difference between the third voltage V3 and the fourth voltage V4 is less than or equal to the second predetermined value, the target voltage generation unit 208 generates the next second target voltage TV2 according to the fourth voltage V4 corresponding to the current ideal second turning-on time ISWON1 and the previous second adjustment value outputted by the adjustment value generation unit 206. In Step 816, as shown in FIGS. 1, 4, the gate driving unit 210 can determine the next second turning-on time SRGATE2 of the gate control signal GCS of the secondary side SEC of the power converter 100 according to the second ramp voltage RV2 corresponding to the next ideal second turning-on time ISWON2 and the next second target voltage TV2, wherein the synchronization switch 108 can be turned on and turned off according to the gate control signal GCS.

As shown in FIG. 4, the next dead time DT2 of the secondary side SEC of the power converter 100 is equal to the difference between the next second turning-on time SRGATE2 and the next ideal second turning-on time ISWON2. In addition, as shown in FIG. 4, when the third voltage V3 is greater than the fourth voltage V4 (that is, the previous ideal second turning-on time ISWON0 is greater than the current ideal second turning-on time ISWON1 and the difference between the third voltage V3 and the fourth voltage V4 is greater than the second predetermined value), the synchronous rectifier 200 can make the next second turning-on time SRGATE2 be less than the current second turning-on time SRGATE1 of the secondary side SEC of the power converter 100. That is to say, the next dead time DT2 is greater than the current dead time DT1 of the secondary side SEC of the power converter 100 to ensure that the primary side PRI and the secondary side SEC of the power converter 100 are not simultaneously turned on.

Figure 9:
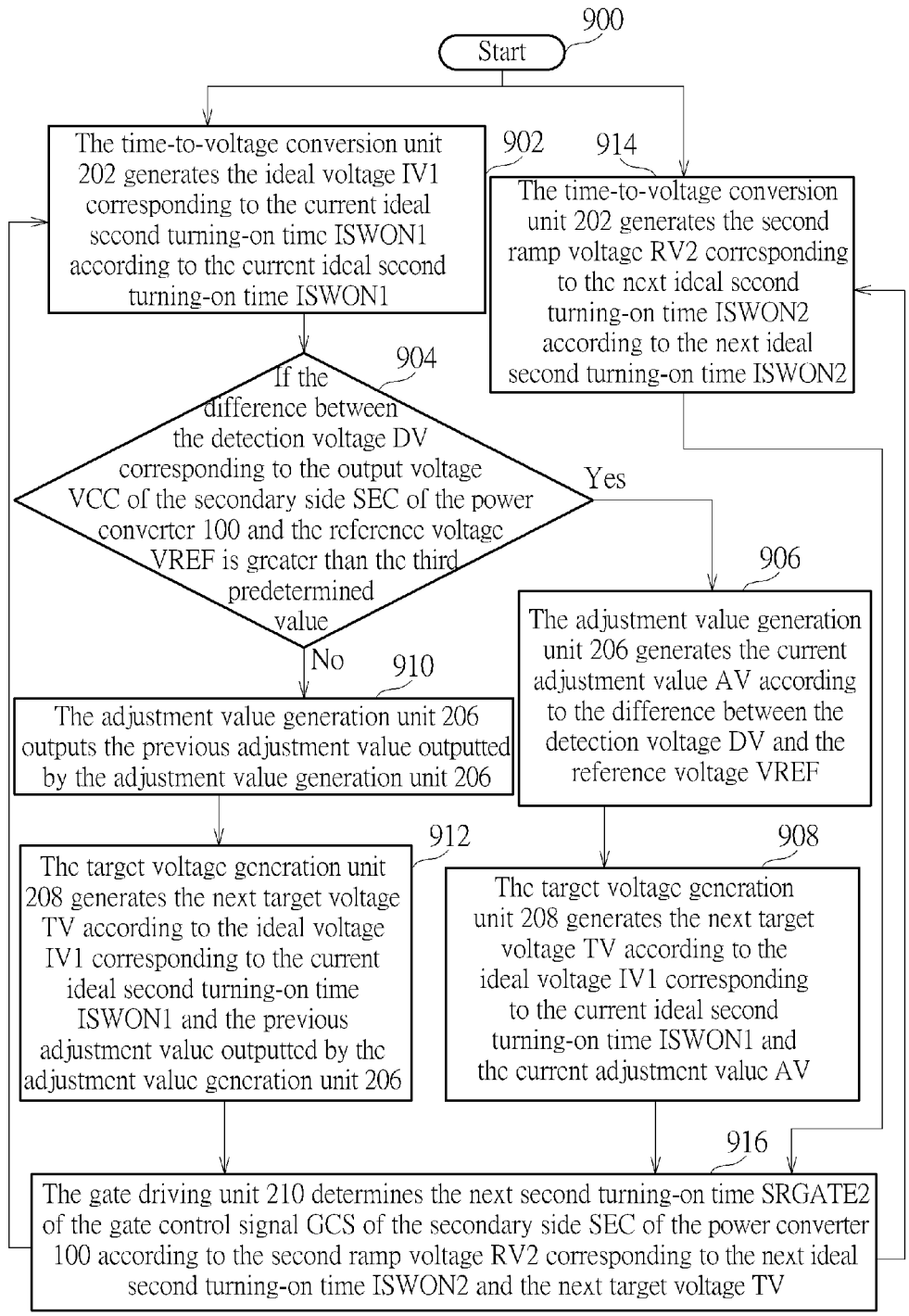
FIG. 9 is a flowchart illustrating a method for controlling a dead time of a secondary side of a power converter according to a seventh embodiment.

Please refer to FIGS. 5, 9. FIG. 9 is a flowchart illustrating a method for controlling a dead time of a secondary side of a power converter according to a seventh embodiment. The method in FIG. 9 is illustrated using the power converter 100 and the synchronous rectifier 500 in FIG. 5. Detailed steps are as follows:

Step 900: Start.

Step 902: The time-to-voltage conversion unit 202 generates the ideal voltage IV1 corresponding to the current ideal second turning-on time ISWON1 according to the current ideal second turning-on time ISWON1.

Step 904: If the difference between the detection voltage DV corresponding to the output voltage VCC of the secondary side SEC of the power converter 100 and the reference voltage VREF is greater than the third predetermined value; if yes, go to Step 906; if no, go to Step 910.

Step 906: The adjustment value generation unit 206 generates the current adjustment value AV according to the difference between the detection voltage DV and the reference voltage VREF.

Step 908: The target voltage generation unit 208 generates the next target voltage TV according to the ideal voltage IV1 corresponding to the current ideal second turning-on time ISWON1 and the current adjustment value AV, go to Step 916.

Step 910: The adjustment value generation unit 206 outputs the previous adjustment value outputted by the adjustment value generation unit 206.

Step 912: The target voltage generation unit 208 generates the next target voltage TV according to the ideal voltage IV1 corresponding to the current ideal second turning-on time ISWON1 and the previous adjustment value outputted by the adjustment value generation unit 206, go to Step 916.

Step 914: The time-to-voltage conversion unit 202 generates the second ramp voltage RV2 corresponding to the next ideal second turning-on time ISWON2 according to the next ideal second turning-on time ISWON2, go to Step 916;

Step 916: The gate driving unit 210 determines the next second turning-on time SRGATE2 of the gate control signal GCS of the secondary side SEC of the power converter 100 according to the second ramp voltage RV2 corresponding to the next ideal second turning-on time ISWON2 and the next target voltage TV, go to Step 902.

In Step 902 and Step 914, as shown in FIG. 5, the time-to-voltage conversion unit 202 can generate the ideal voltage IV1 corresponding to the current ideal second turning-on time ISWON1 according to the current ideal second turning-on time ISWON1, and generate the second ramp voltage RV2 corresponding to the next ideal second turning-on time ISWON2 according to the next ideal second turning-on time ISWON2. In Step 906, as shown in FIG. 5, the adjustment value generation unit 206 can receive the detection voltage DV corresponding to the output voltage VCC of the secondary side SEC of the power converter 100 through the pin 220 of the synchronous rectifier 500, and generate the current adjustment value AV according to the detection voltage DV and the reference voltage VREF, wherein the current adjustment value AV is a fixed value or an adjustable value. That is to say, when the detection voltage DV is changed (e.g. the detection voltage DV is increased or decreased), resulting in the difference between the detection voltage DV and the reference voltage VREF being greater than the third predetermined value, the adjustment value generation unit 206 can generate the current adjustment value AV according to the difference between the detection voltage DV and the reference voltage VREF. In addition, the detection voltage DV is equal to the voltage of the node FBNODE coupled to the output terminal OUT of the secondary side SEC of the power converter 100, or equal to the voltage of the node CNODE coupled to the photocoupler 222 of the secondary side SEC of the power converter 100. In Step 908, as shown in FIG. 5, after the adjustment value generation unit 206 generates the current adjustment value AV, the target voltage generation unit 208 can generate the next target voltage TV according to the ideal voltage IV1 corresponding to the current ideal turning-on time ISWON1 of the secondary side SEC of the power converter 100 and the current adjustment value AV. In addition, in Step 910, when the difference between the detection voltage DV and the reference voltage VREF is less than or equal to the third predetermined value, the adjustment value generation unit 206 outputs the previous adjustment value outputted by the adjustment value generation unit 206, rather than generating the current adjustment value AV. In Step 912, when the difference between the detection voltage DV and the reference voltage VREF is less than or equal to the third predetermined value, the target voltage generation unit 208 generates the next target voltage TV according to the ideal voltage IV1 corresponding to the current ideal turning-on time ISWON1 of the secondary side SEC of the power converter 100 and the previous adjustment value outputted by the adjustment value generation unit 206. In Step 916, as shown in FIG. 5, after the target voltage generation unit 208 generates the next target voltage TV, the gate driving unit 210 can determine the next second turning-on time SRGATE2 of the gate control signal GCS of the secondary side SEC of the power converter 100 according to the second ramp voltage RV2 corresponding to the next ideal second turning-on time ISWON2 and the next target voltage TV.

Because the adjustment value generation unit 206 can generate the current adjustment value AV when the detection voltage DV is changed (e.g. the detection voltage DV is increased or decreased), resulting in the difference between the detection voltage DV and the reference voltage VREF being greater than the third predetermined value, the synchronous rectifier 500 can make the next second turning-on time SRGATE2 be less than the current second turning-on time SRGATE1 (that is, the next dead time DT2 is greater than the current dead time DT1) to ensure that the primary side PRI and the secondary side SEC of the power converter 100 are not simultaneously turned on.

To sum up, the method for controlling the dead time of the secondary side of the power converter can reduce the turning-on time of the gate control signal of the synchronization switch of the secondary side of the power converter to ensure that the primary side and the secondary side of the power converter are not simultaneously turned on when the difference between the previous first turning-on time and the current first turning-on time of the synchronization signal is greater than the first predetermined value, the difference between the previous ideal second turning-on time and the current ideal second turning-on time of the ideal turning-on signal is greater than the second predetermined value, or the difference between the detection voltage corresponding to the output voltage of the secondary side of the power converter and the reference voltage is greater than the third predetermined value. In addition, when the load coupled to the secondary side of the power converter is heavier, the present invention can also compensate the output current of the secondary side of the power converter by turning on the compensation switch to respond to the heavier load coupled to the secondary side of the power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a dead time of a secondary side of a power converter, the method comprising:
giving a previous first turning-on time and a current first turning-on time corresponding to a primary side of the power converter;
generating a first voltage and a second voltage according to the previous first turning-on time and the current first turning-on time, respectively;
generating a current first target voltage according to the first voltage, the second voltage, and an ideal voltage corresponding to a previous ideal second turning-on time of the secondary side; and determining a current second turning-on time of the secondary side according to a first ramp voltage corresponding to a current ideal second turning-on time of the secondary side and the current first target voltage, wherein a difference between the current second turning-on time and the current ideal second turning-on time is a current dead time of the secondary side;

wherein when the first voltage is not equal to the second voltage, the current dead time is not equal to a previous dead time of the secondary side.

2. The method of claim 1, wherein when a difference between the second voltage and the first voltage is greater than a first predetermined value, the current dead time is greater than the previous dead time, and a difference between the current second turning-on time and a previous second turning-on time of the secondary side is equal to a product of a difference between the previous first turning-on time and the current first turning-on time and a predetermined proportion, wherein the predetermined proportion is greater than 1, and the predetermined proportion corresponds to a turns ratio of a primary side winding to a secondary side winding.

3. The method of claim 1, wherein when the power converter is in a continuous current mode (CCM), the previous first turning-on time and the current first turning-on time are equal to a turning-on time of a power switch of the primary side of the power converter, and when the power converter is in a discrete current mode (DCM) and a quasi resonant mode (quasi resonant mode), the previous first turning-on time and the current first turning-on time are greater than the turning-on time of the power switch of the primary side of the power converter.

4. The method of claim 1, wherein an ideal turning-on signal corresponding to the secondary side of the power converter comprises the previous ideal second turning-on time and the current ideal second turning-on time, and the ideal turning-on signal is inverse to a synchronization signal corresponding to the primary side of the power converter, wherein the synchronization signal corresponds to a turning-on time of a power switch of the primary side of the power converter.

5. The method of claim 1, wherein generating the current first target voltage according to the first voltage, the second voltage, and the ideal voltage corresponding to the previous ideal second turning-on time comprises:
generating a current first adjustment value when a difference between the second voltage and the first voltage is greater than a first predetermined value; and
generating the current first target voltage according to the ideal voltage corresponding to the previous ideal second turning-on time of the secondary side and the current first adjustment value.

6. The method of claim 1, wherein generating the current first target voltage according to the first voltage, the second voltage, and the ideal voltage corresponding to the previous ideal second turning-on time of the secondary side comprises:
outputting a previous first adjustment value when a difference between the second voltage and the first voltage is less than or equal to a first predetermined value; and
generating the current first target voltage according to the ideal voltage corresponding to the previous ideal second turning-on time of the secondary side and the previous first adjustment value.

7. The method of claim 1, wherein determining the current second turning-on time of the secondary side according to the first ramp voltage corresponding to the current ideal second turning-on time of the secondary side and the current first target voltage comprises:
generating the first ramp voltage according to the current ideal second turning-on time; and
determining the current second turning-on time according to the current first target voltage and the first ramp voltage.

8. The method of claim 1, further comprising:
generating a third voltage and a fourth voltage according to the previous ideal second turning-on time of the secondary side and the current ideal second turning-on time, respectively;
generating a next second adjustment value when a difference between the fourth voltage and the third voltage is greater than a second predetermined value;
generating a next second target voltage according to the fourth voltage and the next second adjustment value;
generating a second ramp voltage according to a next ideal second turning-on time corresponding to the secondary side; and
determining a next second turning-on time of the secondary side according to the next second target voltage and the second ramp voltage.

9. The method of claim 8, wherein the previous ideal second turning-on time, the current ideal second turning-on time, and the next ideal second turning-on time correspond to an ideal turning-on time of a synchronization switch of the secondary side of the power converter, and the next second turning-on time of the secondary side and the current second turning-on time of the secondary side correspond to a turning-on time of the synchronization switch of the secondary side of the power converter.

10. The method of claim 1, further comprising:
turning on a compensation switch of the power converter to compensate an output current of the secondary side according to a gate control signal of a synchronization switch of the secondary side, an ideal turning-on signal corresponding to the synchronization switch of the secondary side, or a control signal of a power switch of the primary side.

11. A method for controlling a dead time of a secondary side of a power converter, the method comprising:
giving a previous ideal turning-on time and a current ideal turning-on time corresponding to the secondary side of the power converter;
generating a first voltage and a second voltage according to the previous ideal turning-on time and the current ideal turning-on time, respectively;
generating a next target voltage according to the first voltage and the second voltage; and
determining a next turning-on time of the secondary side according to a ramp voltage corresponding to a next ideal turning-on time of the secondary side and the next target voltage, wherein a difference between the next turning-on time and the next ideal turning-on time is equal to a next dead time of the secondary side;
wherein when the first voltage is different from the second voltage, the next dead time is not equal to a current dead time of the secondary side.

12. The method of claim 11, wherein the previous ideal turning-on time, the current ideal turning-on time, and the next ideal turning-on time correspond to an ideal turning-on time of a synchronization switch of the secondary side of the power converter, and the next turning-on time of the secondary side and a current turning-on time of the secondary side correspond to a turning-on time of the synchronization switch of the secondary side of the power converter.

13. The method of claim 11, wherein an ideal turning-on signal corresponding to the secondary side of the power converter comprises the previous ideal turning-on time, the current ideal second turning-on time, and the next ideal turning-on time, and the ideal turning-on signal is inverse to a synchronization signal corresponding to a primary side of the power converter, wherein the synchronization signal corresponds to a turning-on time of a power switch of the primary side of the power converter.

14. The method of claim 11, wherein generating the next target voltage according to the first voltage and the second voltage comprises:
generating an adjustment value when a difference between the second voltage and the first voltage is greater than a predetermined value; and
generating the next target voltage according to the second voltage and the adjustment value.

15. The method of claim 11, wherein generating the next target voltage according to the first voltage and the second voltage comprises:
outputting a previous adjustment value when a difference between the second voltage and the first voltage is less than or equal to a predetermined value; and
generating the next target voltage according to the second voltage and the previous adjustment value.

16. The method of claim 11, wherein determining the next turning-on time of the secondary side according to the ramp voltage corresponding to the next ideal turning-on time of the secondary side and the next target voltage comprises:
generating the ramp voltage according to the next ideal turning-on time; and
determining the next turning-on time according to the next target voltage and the ramp voltage.

17. The method of claim 11, wherein when the first voltage is different from the second voltage, the next dead time is less than the current dead time, and a difference between the next turning-on time and a current turning-on time of the secondary side is equal to a product of a difference between a previous turning-on time of the secondary side and the current turning-on time and a predetermined proportion, wherein the predetermined proportion is greater than 1, and the predetermined proportion corresponds to a turns ratio of a primary side winding to a secondary side winding.

18. The method of claim 11, further comprising:
turning on a compensation switch of the power converter to compensate an output current of the secondary side according to a gate control signal of a synchronization switch of the secondary side, an ideal turning-on signal corresponding to the synchronization switch of the secondary side, or a control signal of a power switch of a primary side of the power converter.

19. A method for controlling a dead time of a secondary side of a power converter, the method comprising:
generating a next target voltage according to a detection voltage corresponding to a current output voltage of the secondary side, a reference voltage, and an ideal voltage corresponding to a current ideal turning-on time of the secondary side; and
determining a next turning-on time of the secondary side according to a ramp voltage corresponding to a next ideal turning-on time of the secondary side and the next target voltage, wherein a difference between the next turning-on time and the next ideal turning-on time is equal to a next dead time of the secondary side.

20. The method of claim 19, wherein generating the next target voltage according to the detection voltage, the reference voltage, and the ideal voltage corresponding to the current ideal turning-on time of the secondary side, comprises:
generating an adjustment value when a difference between the detection voltage and the reference voltage is greater than a third predetermined value; and
generating the next target voltage according to the ideal voltage corresponding to the current ideal turning-on time and the adjustment value.

21. The method of claim 19, wherein generating the next target voltage according to the detection voltage, the reference voltage, and the ideal voltage corresponding to the current ideal turning-on time of the secondary side, comprises:
outputting a previous adjustment value when a difference between the detection voltage and the reference voltage is less than or equal to a third predetermined value; and
generating the next target voltage according to the ideal voltage corresponding to the current ideal turning-on time and the previous adjustment value.

22. The method of claim 19, wherein the detection voltage is a voltage of a node coupled to an output terminal of the secondary side.

23. The method of claim 19, wherein the detection voltage is a voltage of a node coupled to a photocoupler of the secondary side.

24. The method of claim 19, further comprising:
turning on a compensation switch of the power converter to compensate an output current of the secondary side according to a gate control signal of a synchronization switch of the secondary side, an ideal turning-on signal corresponding to the synchronization switch of the secondary side, or a control signal of a power switch of a primary side of the power converter.

* * * * *